United States Patent [19]

Bowen

[11] Patent Number: 5,442,786
[45] Date of Patent: Aug. 15, 1995

[54] METHOD FOR RECORDING USER INTERACTION WITH A COMPUTER DATABASE TO GENERATE REPORTS

[76] Inventor: Robert E. Bowen, 1515 S. 152nd Ave. Cir., Omaha, Nebr. 68144

[21] Appl. No.: 234,223

[22] Filed: Apr. 28, 1994

[51] Int. Cl.⁶ ............................................. G06F 17/30
[52] U.S. Cl. .................................... 395/600; 364/943; 364/974; 364/963; 364/DIG. 2
[58] Field of Search ......................................... 395/600

[56] References Cited

U.S. PATENT DOCUMENTS

| | | | |
|---|---|---|---|
| 4,348,744 | 9/1982 | White | 395/200 |
| 4,954,699 | 9/1990 | Coffey et al. | 235/462 |
| 4,975,840 | 12/1990 | DeTore et al. | 364/401 |
| 5,025,374 | 6/1991 | Roizen et al. | 364/413.02 |
| 5,159,667 | 10/1992 | Borrey et al. | 395/148 |
| 5,326,270 | 7/1994 | Ostby et al. | 434/362 |
| 5,341,291 | 8/1994 | Roizen et al. | 364/413.02 |

OTHER PUBLICATIONS

D. Goodman "The Complete HyperCard 2.2 Handbook" Random House, 1987, pp. 44–61, 216–219.
N. Yankelovich et al "Reading and Writing the Electronic Book" IEEE Computer, Oct. 1985, pp. 15–30.
J. Conklin "Hypertext: An Introduction and Survey" IEEE Computer, Sep. 1987, pp. 17–41.

*Primary Examiner*—Thomas G. Black
*Assistant Examiner*—Peter Y. Wang
*Attorney, Agent, or Firm*—Zarley, McKee, Thomte Voorhees & Sease; Mark D. Frederiksen

[57] ABSTRACT

A method for creating a hierarchical data tree includes the initial step of providing a computer information processing system with a data base which interacts with user input to build the data tree based upon system responses. The user initially designates a source field and a next record field and the system searches the data base for records which have a target field matching the designated source field. The next record field of each record determines interaction with records, which have target fields matching the displayed record's source field. If a response is expected from the user, the user may either accept the record displayed or provide a separate user response as a selection. If no response is expected, according to the next record field, the system automatically selects the first matching record found. The system records the selection, whether from the system or from the user, utilizing a block of computer memory. The system then utilizes the recorded node as the basis for further search and further interaction. The system first creates a vertical leg of the data tree, before creating horizontal branches, according to the rules of interaction.

6 Claims, 12 Drawing Sheets

5,442,786

METHOD FOR RECORDING USER INTERACTION WITH A COMPUTER DATABASE TO GENERATE REPORTS

TECHNICAL FIELD

The present invention relates generally to systems for creating reports of complex data records, and more particularly to a system which utilizes a user interface interactive with a data base to build a hierarchical data tree.

BACKGROUND OF THE INVENTION

Computers have gone a long way towards increasing efficiency in many businesses. One particular area for which computers are especially well suited is the area of record keeping.

While there are a wide variety of data base record keeping systems currently on the market, they suffer several drawbacks. First, data base systems presently on the market are relatively inflexible in the format in which questions are presented to the user. The recording of data into a data base does not permit interaction between the user and the data base to customize the information stored by the data base. Rather, the user must either include all information from a particular field, or none of the information. Again, while conventional data bases permit recording of various collections of data from one or more different fields, they do not permit a user to create a report which permits user interaction in making choices, insertions, and the like.

SUMMARY OF THE INVENTION

It is therefore a general object of the present invention to provide an improved method for creating a data record in which greater flexibility is provided as to which questions are presented to the user and more control is allowed as to which responses are returned from the user.

Yet another object is to provide a method for building a hierarchical data tree based upon user interactivity with a data base.

These and other objects will be apparent to those skilled in the art.

The method for creating a hierarchical data tree of the present invention includes the initial step of providing a computer information processing system with a user interface, a data base and a system of rules which governs the interaction between the interface and the data base and determines a method of building a structured record of the interaction referred to as a hierarchical data tree. The user initially designates a target field and a next record field and the system searches the data base for records which have a source field matching the designated target field. The next record field of each record determines interaction with records matching the displayed record's target field. If a response is expected from the user, the user may either accept the record displayed or provide a separate user response as a selection. If no response is expected, according to the next record field, the system automatically selects the first matching record found. The system records the selection, whether from the system or from the user, utilizing a block of computer memory. The system then utilizes the recorded node as the basis for further search and further interaction. The system first creates a vertical leg of the data tree, before creating horizontal branches, according to the rules of interaction.

DESCRIPTION OF THE PREFERRED EMBODIMENT

Figure 1:
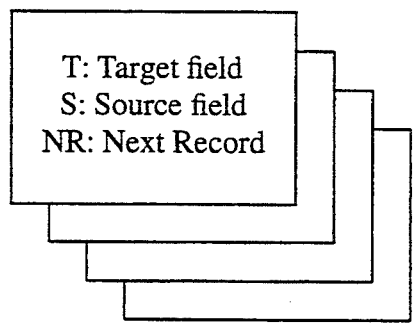
FIG. 1 is a schematic diagram of data base records utilized in the present invention.

Referring now to the drawings, the method of the present invention includes an interaction rule-based system consisting of a user interface which interacts with a data base to build a hierarchical data tree based upon the system responses.

The data base consists of multiple records each with a minimum of three fields: a target field "T", a source field "S", and a next record field "NR", as shown in FIG. 1.

Figure 2:
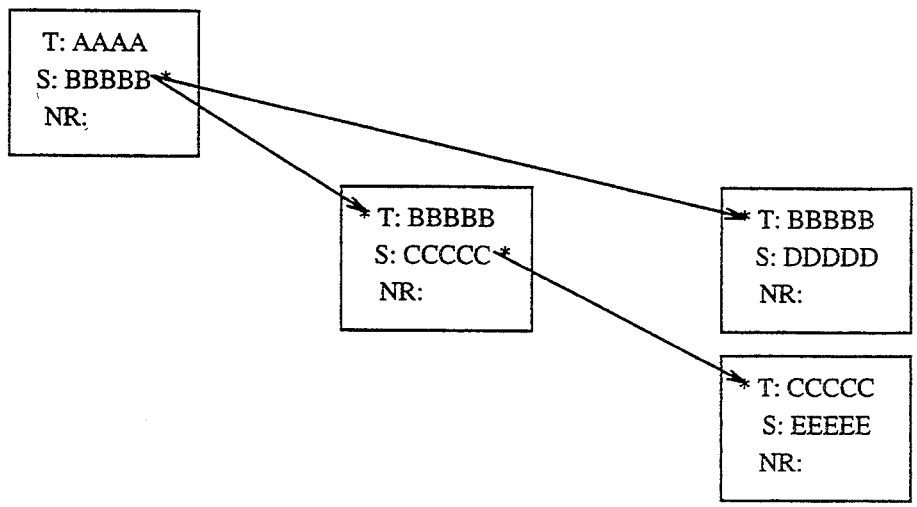
FIG. 2 is a schematic diagram showing the hierarchical relationship of data base records.

The target field and source field are data buffers of identical type and size. Records are placed in the data base such that the source field in one record can be identical to a target field in another record. In this way, a search of the data base set based upon criteria placed in the source field of one record can find or match a different record, based upon information placed in that record's target field. The target and source fields can then act as a linked list between records such that the source field of one record points to one or more target fields in other records, which in turn have their own source fields which can point to other target fields, as shown in FIG. 2.

The next record field determines how the system will interact with the records matching the source field. In its simplest form, a user interaction or response is either "expected" or "not expected" in selecting the next record. If the next record field allows for a user response, the user may select one or more matching records or provide a separate user response to be used as the source field. If the next record field does not allow for a user response, all matching records will be automatically selected by the system in the order of their occurrence in the data base.

Information placed in the target and source fields determines the relationships between records. Every record may reference one or more additional records. The interface interacts between the data base and the user and constructs a record of the interaction.

Figure 3:
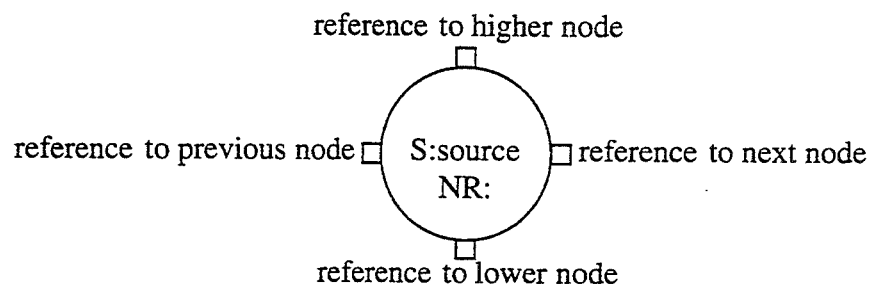
FIG. 3 is a schematic diagram of a nodal structure for storage of interaction records.

A record of the interaction is stored as a series of nodes, as shown in FIG. 3. A node consists of a block of memory which references the source field and next record field of the selected record and contains references to other nodes selected before and after the present node. In this way a hierarchical pattern of responses emerges.

A record which contains a source field which matches another record's target field can be visualized as located on a higher vertical level to the record it refers to. Records which have a source field which match the target field of more than one record allow for branching in the nodal storage system. Records which have identical target fields are considered to be located on the same horizontal level. In this way nodes are "constructed" when records are selected, the nodes being located on levels which reflect the relationships of the records. In addition to referencing the source field and next record field, a two dimensional node contains references to the next higher level node, lower level node, previous node in the same level, and the next node in the same level.

Figure 4:
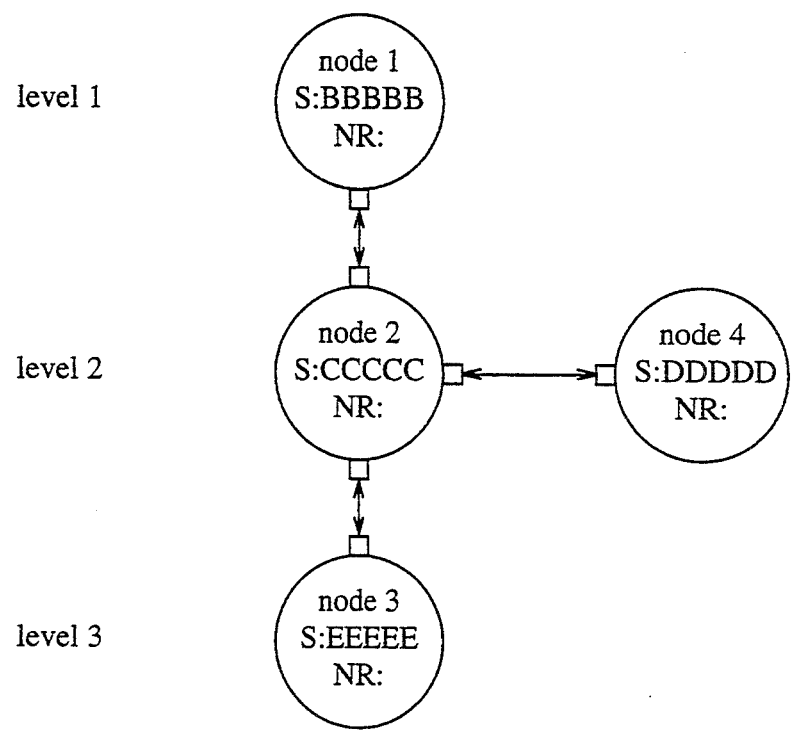
FIG. 4 is a schematic view of a data tree constructed utilizing the nodal storage structure.

The data tree can now be constructed as a branched linked list of nodes, as shown in FIG. 4. The nodal tree can be visualized as consisting of one or more vertical legs with horizontal branch points. Utilizing the system of the present invention, records can be generated describing complex data, guided by the entries in the data base, governed by the user responses, and an interface algorithm.

As mentioned above, a user response is either "expected" or "not expected". If a user response is not expected, then the system will automatically select all matching records in the order of their occurrence in the date base.

Figure 5:
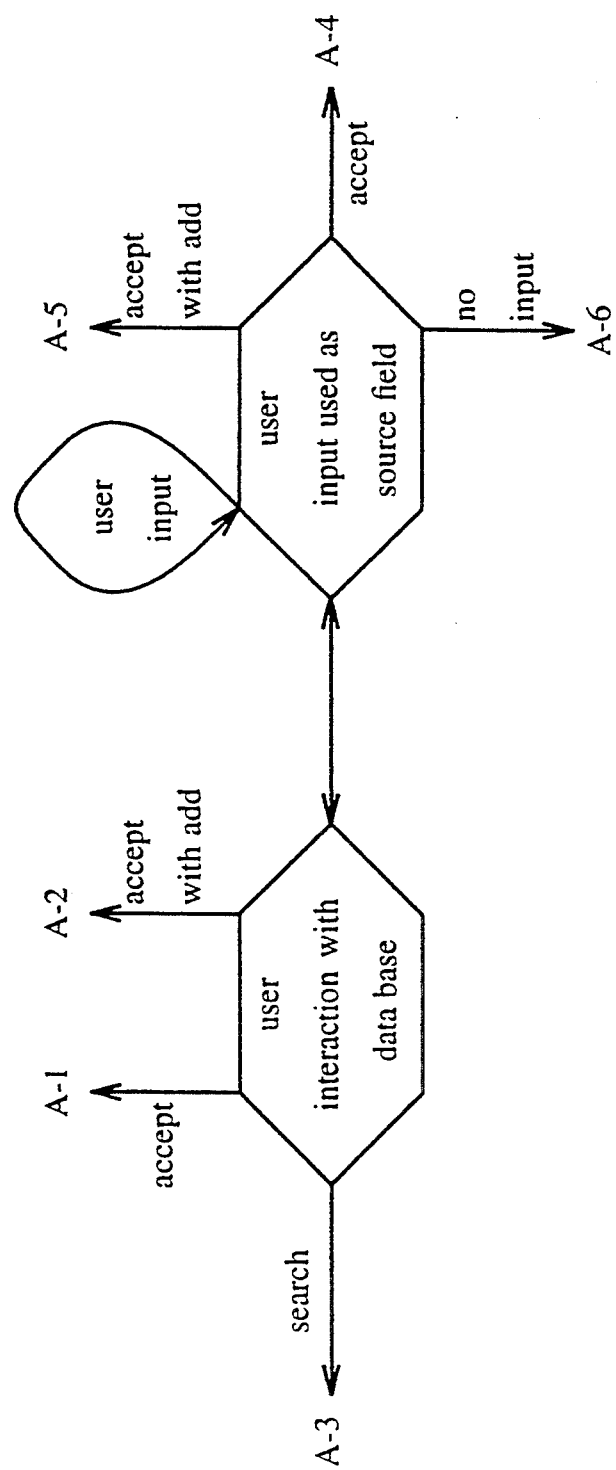
FIG. 5 is a flow chart showing rules of user interaction with the data base.

When the next record field indicates that a user response is "expected", the user may provide input in two different ways, as shown in FIG. 5. The user can either select input generated from the data base (A-1, A-2, and A-3) or provide its own input to be used by the system as though it were a source field provided by the data base (A-4, A-5, A-6).

Three responses deal with data base interactions. The user may accept the match provided by the search on the data base as the only response to the search (A-1). The user may accept the match, while informing the system to look for an additional match for consideration based on the same search criteria (A-2). Finally, the user may reject the match and search for a different match (A-3).

Three responses deal with input provided from the user to be used as the source field. The user may provide their own input to be used as though it were generated by a match in the data base and accept this input as the only response to the previous source field (A-4). The user may accept its own input to be used as the source field while is informing the system to look for additional responses under the previous source field (A-5). The user may provide an "empty" response (A-6).

In this way the user has the flexibility to use the data base to provide source fields for consideration, or input their own source field to be used by the system. This interaction between the user and the data base is central to how the system "constructs" nodes.

Figure 6:
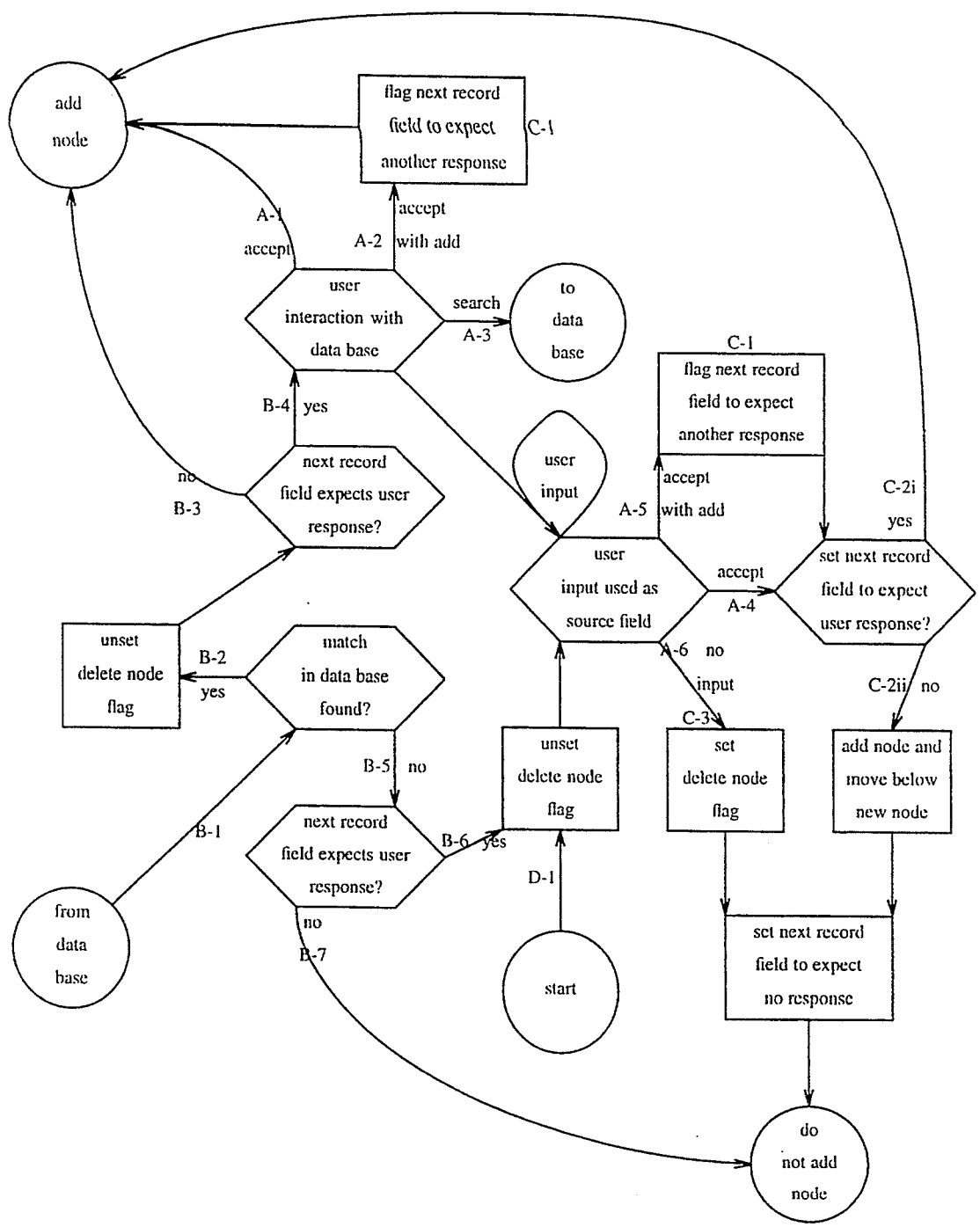
FIG. 6 is a flow chart showing interaction between the user and the data base.

Referring now to FIG. 6, the initial step of the process is to conduct a search of the data base for target fields which match a chosen source field (B-1).

If the target field matches, the system unsets the "delete node" flag (described below) and looks at the next record field (B-2). If the target field matches and the next record field does not expect a user response, the system adds the node (B-3). If the target field matches and the next record field does expect a user response, a user response is prompted by the system (B-4), and the interaction rules of FIG. 5 are carried out. If no target fields match (B-1), the system looks at the next record field (B-5). If no target fields (B-1) match, and the next record field expects a user response, the system unsets a "delete node" flag (described below) and a user response is prompted by the system (B-6), and the interaction rules of FIG. 5 are carried out. If the target field does not match, and the next record field does not expect a user response, a node is not added (B-7).

The results of the user interaction of FIG. 5 are carried out as shown in FIG. 6.

When the user accepts a match from the data base or accepts the user's own input to be used as a source field, and informs the system that another match is needed (A-2, A-5), the system flags the next record field so that when examined, the system is aware that additional input is needed. When the user accepts their own response to be used as the source field, the value of the next record field to be recorded in the resulting node must also be determined. When the next record field is set to expect a user response, the system will add the node and search the data base using the provided source field as the search criteria for a match on the target fields in the data base (C-2(i)). When the next record field is set to not expect a response from the user, the node is added and the system moves to the "low" position of this node (C-2(ii)). The data base is not searched and this vertical leg of the node tree is terminated after adding this node. In cases where no response is generated when the next record field expects a response from the user, the system will not add a node (C-3). In addition, the system will set a "delete node" flag so that higher nodes in this vertical leg may also be deleted (as described in more detail hereinbelow).

The interface between the user and data base constructs the nodes in a linear fashion, completing each vertical leg before adding a horizontal branch. Once a vertical leg is completed, the system will climb to higher level nodes until it finds a branch point. If a branch is added, the vertical leg of this branch is completed before another branch is added.

Some general rules utilized in node construction are as follows (See FIG. 3 and 4).

The source field and next record field of a node always refer to nodes on the next lower level. When the system adds a node, and a node does not exist on that level, the added node is connected at its higher node register. If a node already exists on this level, the added node is connected at its previous node register, on the same horizontal level. Each node must be added to a higher node or previous node. A node cannot have both a higher node and a previous node connection.

Figure 7:
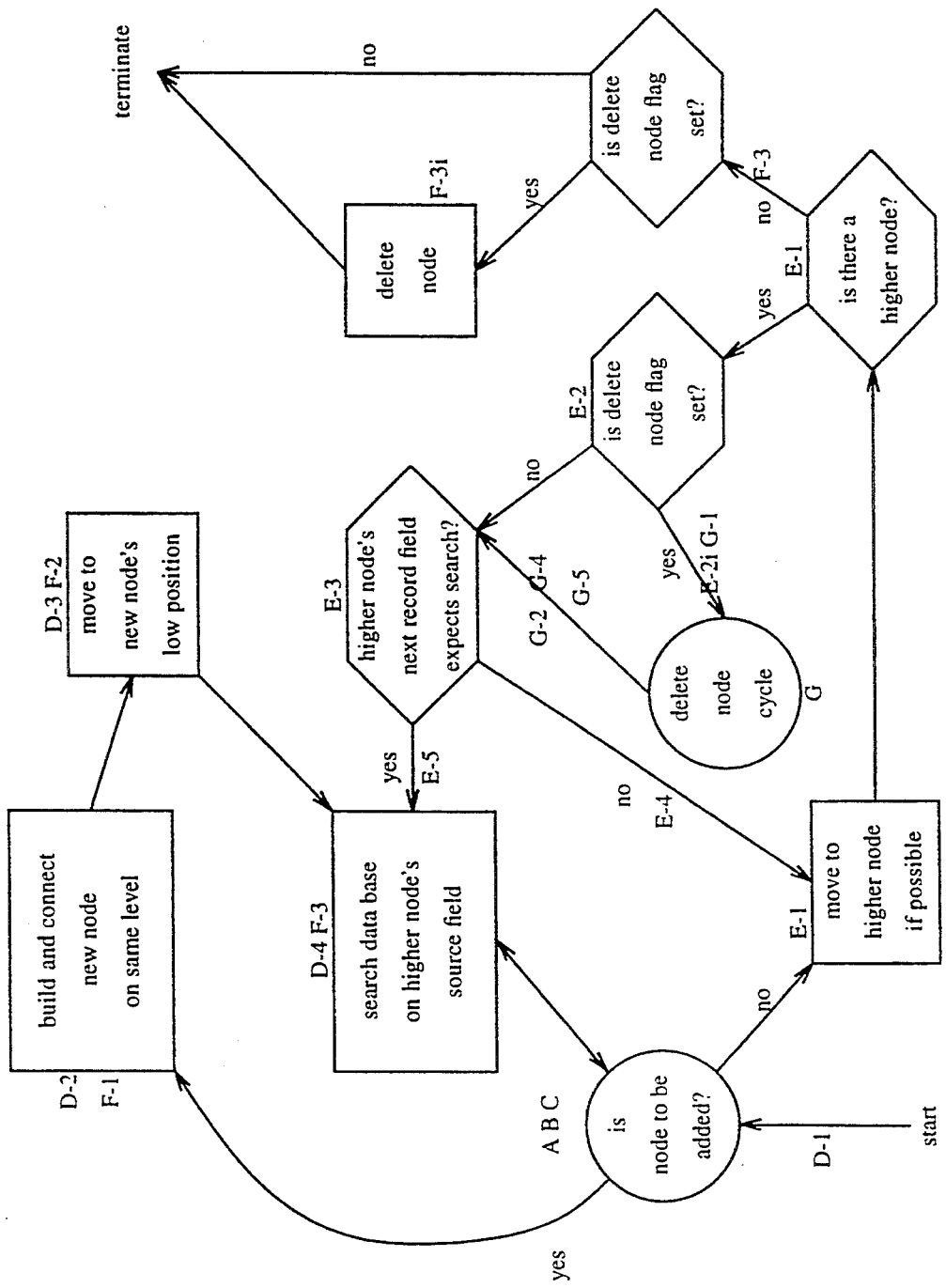
FIG. 7 is a flow chart showing the rules provided for node construction and procedures.
Figure 8:
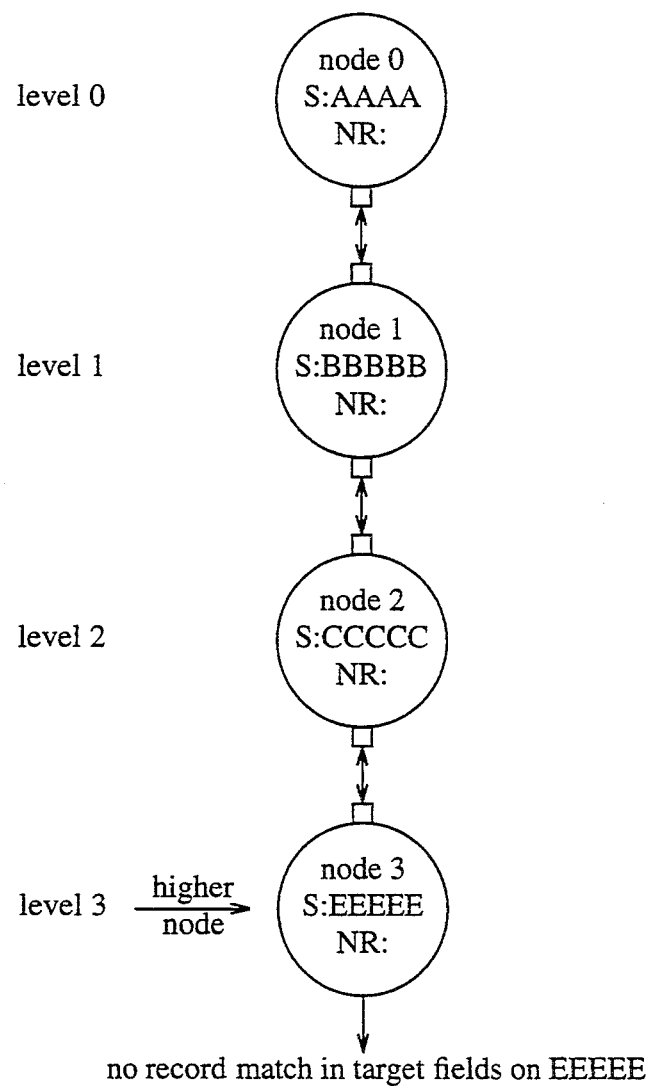
FIG. 8 is a schematic diagram showing vertical node construction.

For the initial selection in the construction of nodes (as shown in FIGS. 7 and 8), the system must be given a source field and next record field value (D-1). After input is provided for the source field, and the next record field is set to accept a single response, the system constructs a Node on level 0 as Node 0 (D-2). As there is no higher node, the Node 0's higher node reference register remains empty. The system then moves to the Node 0's low register and now considers Node 0 the higher node (D-3). If the next record field is set to expect a user response, the system will search the data base for a match in the target fields on the Node 0's source field (D-4). A node is either added or not added.

If the next record field is set to expect a user response, the user may determine the selection. If the next record field is set not to expect a user response, the selection is done automatically by the system. If a node is added, the system constructs a new Node on the next level below Node 0. The higher node (Node 0) references the new node (Node 1) as its lower node. The new node references the higher node as its higher node. This cycle continues until no more vertical nodes can be generated, as shown in FIG. 8.

When the system can no longer add nodes in a vertical fashion, the system will then climb to higher nodes looking for a branch point (E-1), as shown in FIG. 7.

The system moves to its higher node and then looks to see if a higher node exists. If a higher node exists, the system checks to see if a "delete node" flag is set (E-2). If the delete node flag is set, the system will consider deleting the node. If a higher node exists, the system determines whether an additional node may be added on this level. An additional node may be added on this level if the higher node's next record field does not allow for a user response or, if a user response is expected and when the selection was made, the user determined that an additional selection was needed by flagging the higher node's next record field (E-3). If an additional node is not to be added (E-4), the system climbs to its higher node and starts again at step E-1. If an additional node may be added and a node already exists on this level, the system moves to the present node's next node position. The system searches the data base on criteria of the higher nodes source field as in step D-4.

Figure 9:
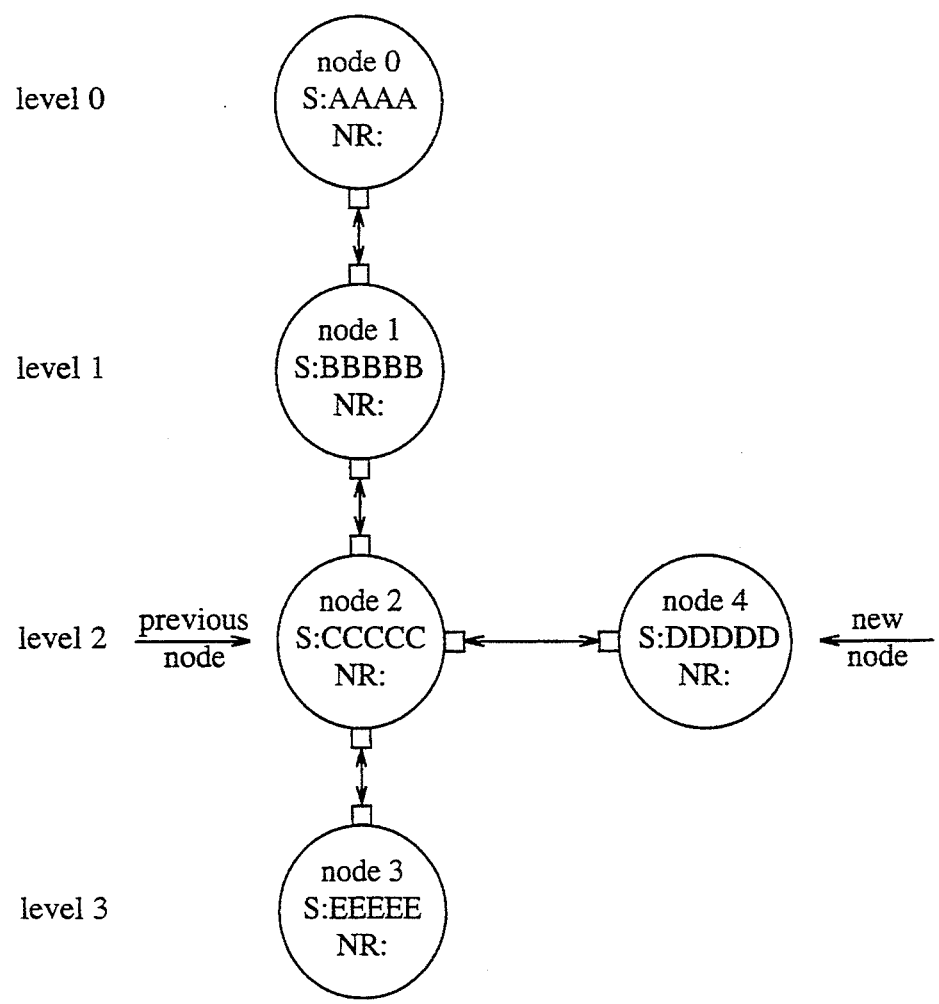
FIG. 9 is a schematic diagram showing horizontal node construction.

Referring now to FIGS. 7 and 9, horizontal node construction takes place only after vertical leg construction has terminated, and the system is searching for a branch point. As shown in FIG. 8, the system's search of the data base has found no record match in target fields selected in Node 3's source field, therefore the system moves upward a level to Node 2.

If a response is selected and a node already exists on this level (Node 2), the system builds a node on the same horizontal level. The Node 2 references the new Node 4 as its "next node", and is connected at the "next node" register of Node 2. Node 4 references Node 2 as its "preview node" register. The system moves to Node 4's lower node register and now searches the data base for a match in the target fields on Node's 4 source field and begins the vertical phase of node construction again at (F-2). When no more responses can be supplied, the system will have climbed to its highest node (Node 0) and terminates. If the "delete node" flag is set, the node is deleted before termination, as discussed hereinbelow.

When the system expects a user response and there is no response, some higher nodes may become unnecessary. Under these circumstances, the system will delete nodes as it climbs the node tree. In this way, unnecessary information is removed from the record.

Figure 10:
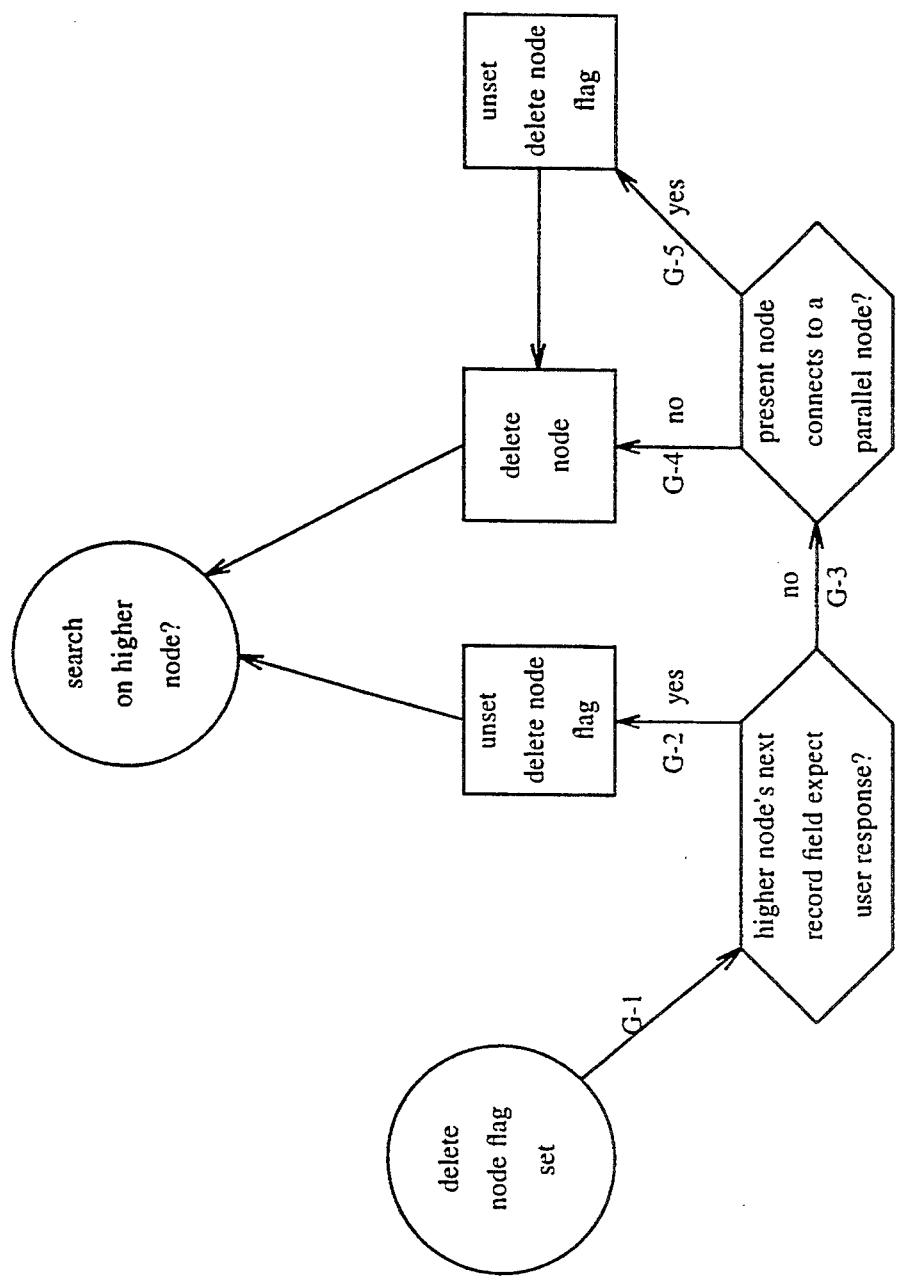
FIG. 10 is a flow chart showing the process of deleting a note.

As shown in FIGS. 7 and 10, if the delete node flag is set, the system checks the higher node's next record field (G-1). If the higher node's next record field expects a user response, the delete node flag is unset and the node is not deleted (G-2). The system checks the higher node's next record field to determine if a search on the data base on the higher node's source field is needed. If the higher node's next record field does not expect a user response, the system checks to see if the node is connected to a previous or next node on the same horizontal level (G-3). If the present note is not connected to a previous or next node, the system deletes the present node ;and then the system checks the higher nodes next record field to determine if a search on the data base on the higher node's source field is needed (G-4).

If the present node is connected to a previous or next node, the system unsets the delete node flag (G-5). The system deletes the present node and then the system checks the higher node's next record field to determine if a search on the data base on the higher node's source field is needed.

Utilizing the above-described rules of interaction, a practical application of the system is described hereinbelow.

Suppose a medical laboratory wishes to generate a series of reports concerning cytology examinations. In this laboratory they may examine cytology specimens from several anatomic sources, such a cervix (pap smear) or lung (sputum). With each pap smear examination the lab decides that specific information on each case should be reported. A short history consisting of the sex of the patient and what medication (pills, red or white) the patient is taking will be included. If the patient is taking red pills, the report will determine if they are square pills or round pills. The number of slides submitted will be recorded. A summary of microscopic findings will also be generated consisting of presence or absence of cells. When cells are present, these cells will be coded as either normal or abnormal. A comment will be placed at the end of the report if needed. The following entries should be made into the data base for this pap report:

TABLE 1

| RECORD NUMBER | TARGET FIELD | SOURCE FIELD | NEXT RECORD FIELD |
|---|---|---|---|
| 1 | cytology | pap | no |
| 2 | cytology | sputum | no |
| 3 | pap | history | no |
| 4 | pap | slides | yes |
| 5 | pap | micro | no |
| 6 | history | sex | no |
| 7 | sex | female | no |
| 8 | history | pills | yes |
| 9 | pills | none | no |
| 10 | pills | red | yes |
| 11 | red | round | no |
| 12 | red | square | no |
| 13 | pills | white | no |
| 14 | micro | cells | yes |
| 15 | cells | none | no |
| 16 | cells | present | yes |
| 17 | present | normal | no |
| 18 | present | abnormal | no |
| 19 | pap | comment | yes |

An entry in the data base is made for a sputum report for the purpose of illustrating a choice of reports under the heading of cytology. To enter a sputum report, the contents of the report would need to be placed in the data base.

To begin the interaction, the user must select the criteria for an initial search. In this case, the user will provide the search criteria as "cytology". For the initial selection, a response is expected from the user.

Figure 11:
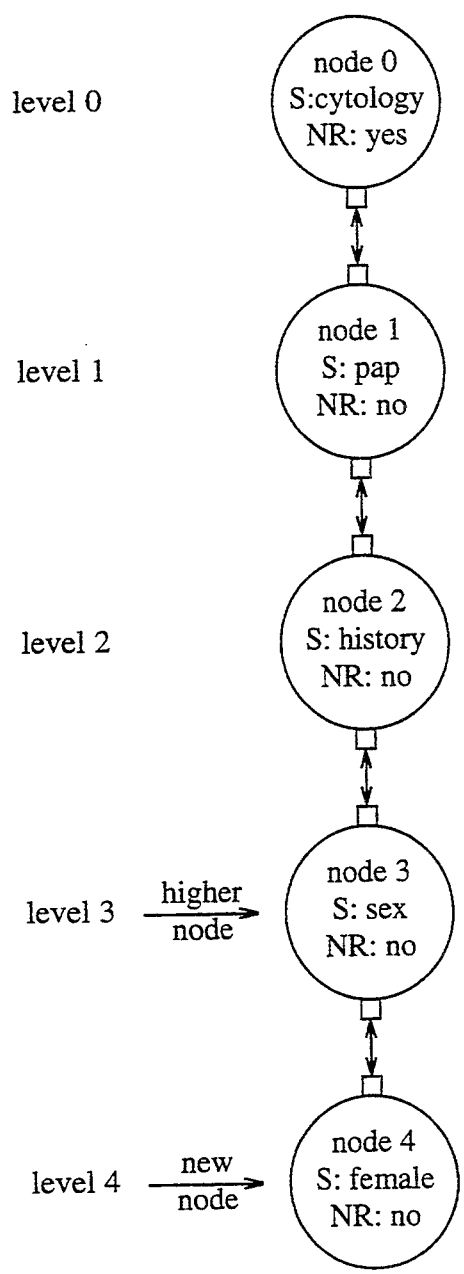
FIG. 11 is a schematic diagram showing vertical node construction in a specific application.

As shown in FIG. 11, the system constructs a node in level 0, which we will refer to as node 0, which contains the user-generated source field "cytology" and the given next record field of "yes" denoting a user response is expected. The system moves to the lower node register (see FIG. 3) and considers this Node 0 to be the "higher" node.

The system now uses the source field of Node 0, "cytology", as the search criteria. A search of the data base on the target fields finds two matches, record #1 and record #2 (see Table 1). As a response is expected from the user, the user may choose between the two records' source fields, "pap" and "sputum".

If we select "pap", a new node is constructed on level 1, which we will refer to as node 1. The system records and references the source field, "pap", and next record field, "no" of the selected record. Node 1 places in its high node register the location of node 0. Node 0 places in its low node register the location of node 1.

The system now moves to the low node register of Node 1 and Node 1 becomes the higher node. The source field "pap" of Node 1 becomes the search criteria on target fields in the data base, and no response is expected from the user.

As no response is expected, the first match on a target field with "pap" as an entry is selected, record 3 (see Table 1). A new Node on level 2 is constructed and will be referred to as node 2. The source field of record #3, "history", and its next record field "no" are recorded and referenced by node 2. Node 2 places in its high node register the location of node 1. Node 1 places in its low node register the location of node 2.

The system now moves to the low node register of Node 2 and Node 2 becomes the higher node. The source field "history" becomes the search criteria on target fields in the data base, no response is expected from the user.

As node 2's next record field expects no response from the user, the first match in the data base in the target fields on the criteria "history" is selected, record #6 (see Table 1). Node 3 is constructed on level 3 and references the source field and next record field of record #6. Node 3 places in its high node register the location of node 2. Node 2 places in its low node register the location of node 3. Record #6 determines that no response is expected from the user on the next match.

Continuing to refer to FIG. 11, Node 3 becomes the higher node. The source field from Node 3 "sex", now becomes the search criteria. As no response is expected from the user, the first match on "sex" is automatically selected, record #7 (see Table 1). (As all pap smears must be obtained on females, there is no need for an alternate selection.) Node 4 is constructed and references the source field "female" and the next record field. Node 4 places in its high node register the location of node 3. Node 3 places in its low node register the location of node 4. Record #7 determines no response from the user is expected on the next match.

Node 4 becomes the higher node. The interface now searches for a match on the source field, "female", of node 4. Finding no match, the system looks at the next record field of its higher node, node 4. As the next record field of node 4 does not allow for a user response, the system moves to node 4's "next node" position and looks for a previously unused match in the target fields for "sex". Finding no matches, the system climbs to node 3 which becomes the "present" node. The system looks at the next record field of node 3's higher node, node 2. As the next record field of node 2 does not allow for a user response, the system moves to the "next node" position of node 3.

Figure 12:
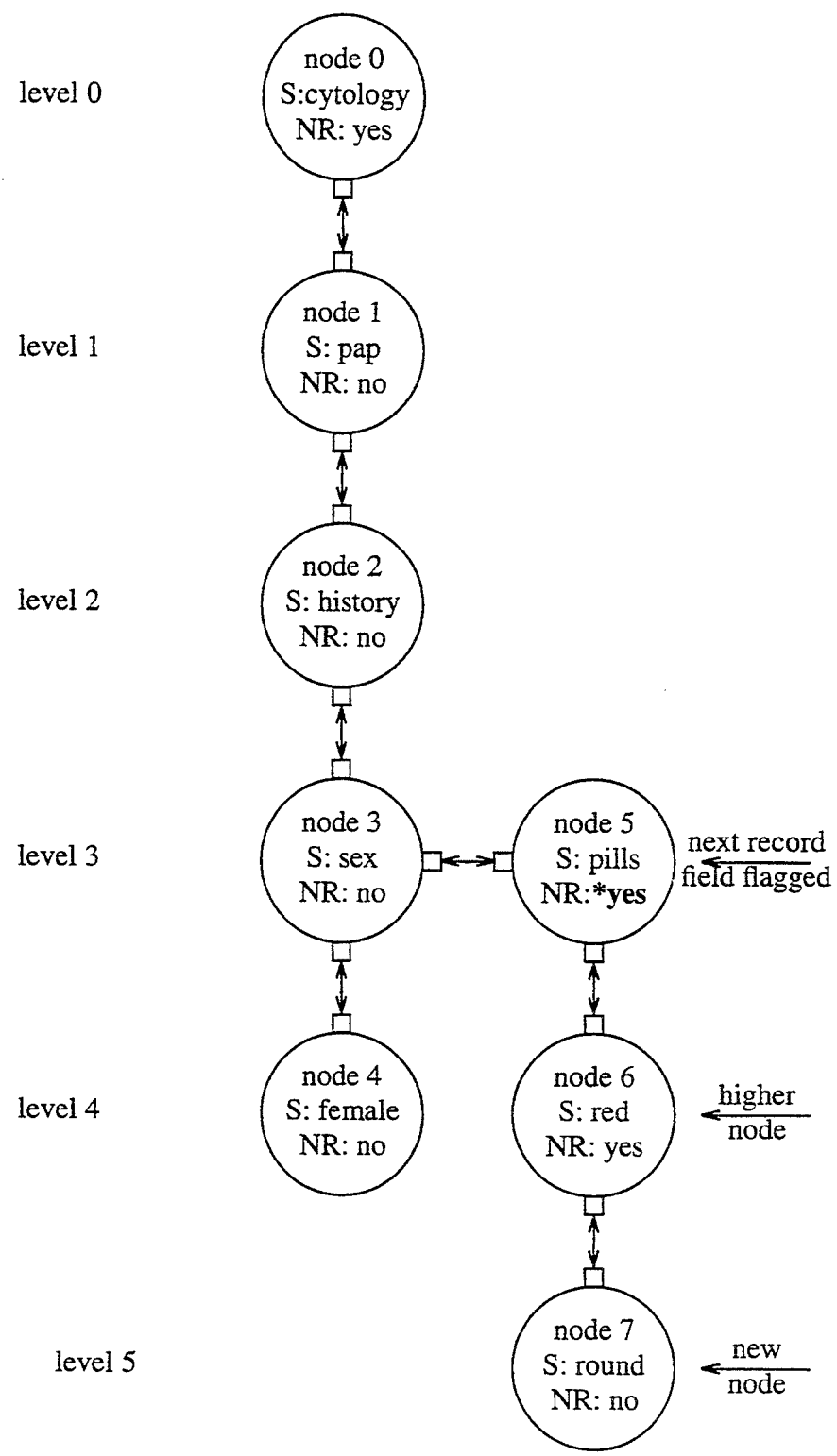
FIG. 12 is a schematic diagram showing node construction beyond that of FIG. 12.

Referring now to FIG. 12, node 3 becomes the previous node. The system looks for a previously unused match in the target fields on node 2's source field "history". A match is found in record #8 (Table 1). Node 5 is now constructed on the same level, adjacent to node 3 and places in its "previous node" register the location of node 3. Node 3 now places in its "next node" register the location of node 5. Node 5 records record #8's source field "pills" and its next record field "yes".

Node 5 becomes the higher node. The system now searches for a match in the target fields on "pills" and finds the first match, record #9, "none" (Table 1). As the system expects a response from the user, the user may select this choice or look for another match. If the user rejects this choice, the next selection to be offered is record #10 "red". If we select record #10 while indicating to the system that another selection is needed, the system constructs node 6 in level 4 and references the source field and next record field of record #10. Node 6 places in its high node register the location of node 5. Node 5 places in its low node register the location of node 6. Record #10 determines that a response is expected from the user on the next match. The system will flag node 5's next record field so that the system will know that the user wishes to make another selection in addition to record #10 from the records in the data base which have target fields which match "pills".

Node 6 becomes the higher node. The system now searches for a match in the target fields of the data base for a match on "red". The source field of the first match, record #11, "round", is presented to the user. If the user selects this match, node 7 is constructed in level 5. Node 7 references record #11's source field and next record field. Node 7 places in its high node register the location of node 6. Node 6 places in its low node register the location of node 7.

Figure 13:
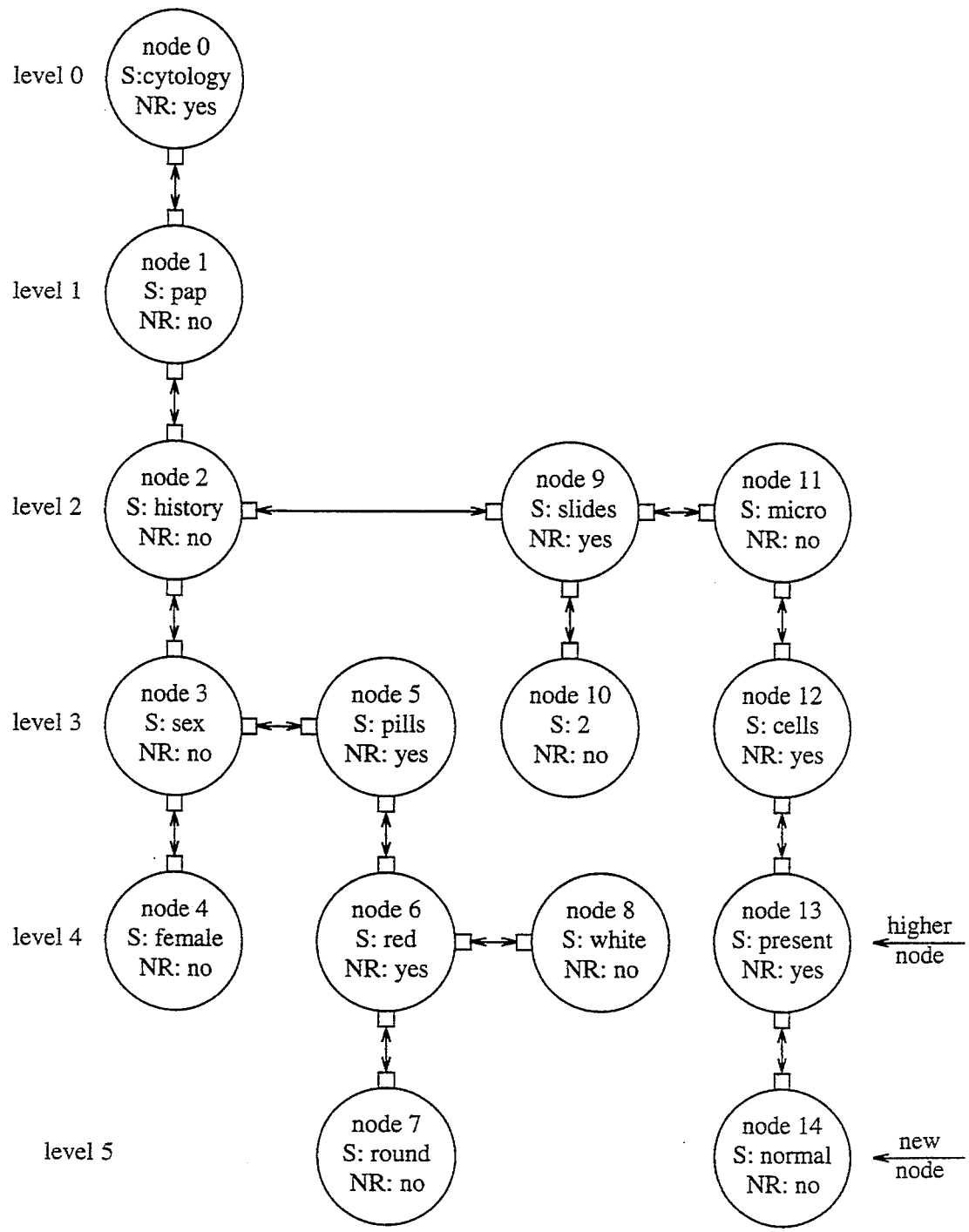
FIG. 13 is a schematic diagram showing nodal construction beyond that of FIG. 13.

Node 7 becomes the higher node. The system now searches the data base in the target fields for a match on round. Finding no match, the system looks at the next record field of its higher node, node 6. As a response is expected from the user and an additional selection has not been indicated, the system climbs to node 6 and looks at the next record field of its higher node, node 5. As a response is expected from the user and an additional selection has been indicated, the system moves to the "next node" position of node 6 and node 6 becomes the previous node (see FIG. 13).

The system looks for the next match in the data base on node #5's source field, "pills". Record #11 follows record #10 and its source field "white" is offered to the user as a selection. If selected without wanting another match, node 8 is constructed in level 4. Node 8 places in its previous node register the location of node 6. Node 6 would place in its next node register the location of node 8. Record #11 determines that no response is expected from the user on the next match. The next record field of node 5 is no longer flagged, as the user does not need another selection.

Node 8 becomes the higher node. The interface now searches for a match on node 8's source field "white".

Finding no match, the system climbs to node 8 and looks at the next record field of its high node, node 5. As node 5's next record field allows for a user response, and is no longer flagged for an additional response, the system climbs to node 5 and looks at the next record field of its higher node, node 2. As node 2 does not allow for a user response, the system moves to the "next node" position of node 3.

Node 3 becomes the previous node. The system looks for a previously unused match in the target fields on node 2's source field "history". Finding no match, the system now climbs to node 2 and looks at the next record field of its higher node, node 1. As the next record field does not allow for a user response, the system moves to the next node position of node 2.

Node 2 becomes the "previous node". The system looks for a previously unused match in the target fields on node 1's source field "pap". A match is found in record #4 (Table 1). Node 9 is now constructed on the same level, adjacent to node 2 and places in its "previous node" register the location of node 2. Node 2 now places in its "next node" register the location of node 9. Node 9 records record 4's source field "slides" and its next record field "yes".

Node 9 becomes the higher node. The system now searches for a match in the target fields on "slides". Finding no match and as the system expects a response from the user, the system prompts the user for a response. The user may respond with its own input to be used as the source field. If the user inputs "2" and accepts this as the only response and assigns the value "no" to the next record field, the system constructs node 10 in level 3 and references "2" as the source field. Node 10 places in its high node register the location of node 9. Node 9 places in its low node register the location of node 10. As the user assigned the value of "no" to the next record field of node 10 the system will not search the data base on the response referenced by node 10.

Node 9 becomes the higher node. The system will look at the higher node's next record field to determine if another response is needed. As a response is expected from the user and the next record field was not flagged for an additional response, the system will climb to node 9 and look at the next record field of its higher node, node 1. As node 1 does not expect a response from the user, the system moves to the next record position of its present node, node 9.

Nose 9 becomes the previous node. The next unused match in the target fields in the data base on node 1's source field "pap" is selected, record #5. Node 11 is constructed in level 2 and references record #5's source field "micro" and next record field. Node 11 places in its "previous node" register the location of node 9. Node 9 places in its "next node" register the location of node 11.

Node 11 becomes the higher node. The system now searches for a match in the target fields on "micro" and finds a match, record #14 (Table 1). As the system does not expect a response from the user, the system constructs a node 12 on level 3 and references the source field of record #14, "cells" and its next record field "yes". Node 12 places in its high node register the location of node 11. Node 11 would place in its low node register the location of node 12. Record #14 determines that a response is expected from the user in selecting the next node.

Node 12 becomes the higher node. The system searches the target fields in the data base for a match on node 12's source field "cells". The first match, record #15 is presented to the user. If the user selects record #15, "none" is recorded and as there are no selections in the target fields which match "none", the system would begin to climb the nodes looking for another parallel match. If, however, the user selects record #16, "present", a match in the target fields of records in the data base can be found, and this leg of the node tree is continued. If we select record #16, "present" the system constructs node 13 in level 4 and references the source field and next record field of the record. Node 12 places in its low node register the location of node 13. Node 13 places in its high node register the location of node 12. Record #16 determines that a response is expected from the user on the next match.

Node 13 becomes the higher node. The source field from node 13 "present", now becomes the search criteria. There are two matches in the data base, record #17, "normal", and record #18, "abnormal". If the user selects "normal", Node 14 is constructed and references the source field "normal" and the next record field, "no". Node 14 places in its high node register the location of node 13. Node 13 places in its low node register the location of node 14. Record #17 determines no response from the user is expected on the next match.

Figure 14:
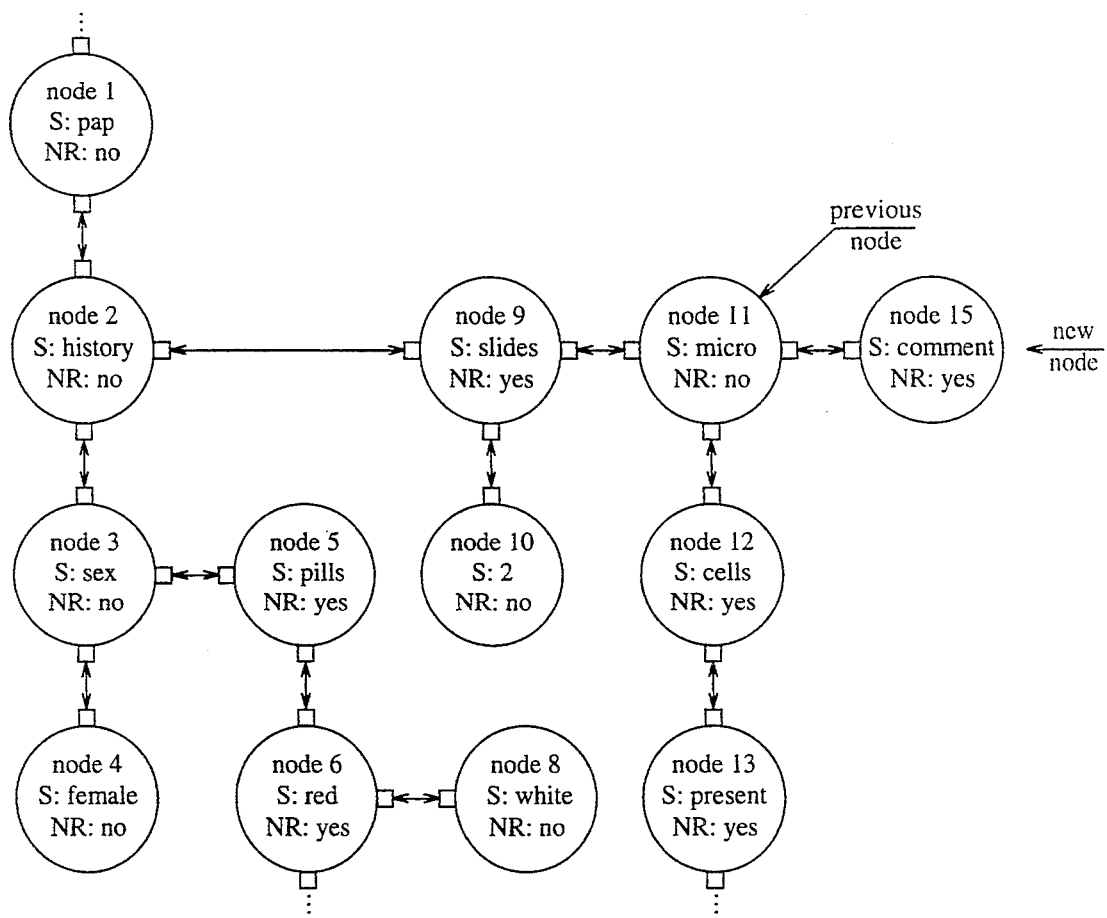
FIG. 14 is a schematic diagram showing the deletion of a node.

Node 14 becomes the higher node. The interface now searches for a match on the source field of node 14, "normal". Finding no match, and as no response is expected, the system climbs to node 14 and looks at the next record field of node 13. As this node allows for a user response and the user has not requested an additional selection, the system now climbs to node 13 and looks at the next record field of node 12. As this node allows for a user response and the user has not requested an additional selection, the system now climbs to node 12 and looks at the next record field of node 11. As this node does not allow for a user response, the system moves to the next record position of node 11 and looks for a previously unused match in the target fields on "micro". Finding none, the system now climbs to node 11 and looks at the next record field of node 1. As this next record field does not allow for a user response, the system moves to the next record position of node 11. Node 11 becomes the previous node. The system then looks for a previously unused match in the target fields on "pap". A match is found in record #19 (Table 1). As shown in FIG. 14, node 15 is now constructed on the same level and adjacent to node 11 and places in its previous node register the location of node 11. Node 11 now places in its next node register the location of node 15. Node 15 records record #19's source field "comment" and its next record field "yes".

Node 15 becomes the higher node. The system searches for a match on node 15's source field "comment". Finding none and as the system expects a user response, the system prompts for a user response.

If the user provides an empty response, the system does not construct a node. The system sets the delete node flag and then climbs to its higher node, node 15. The system looks at the higher node's next record field.

As the higher node's next record field does not expect a user response, the system checks to see if the node is connected to a parallel node. As note #15 connects to a parallel node the delete node flag is unset.

The system deletes node 15 and node 11 becomes the previous node.

As the higher node's next record field does not expect a user response, the system looks for a previously unused match in the target fields on its higher node's source field "pap".

Finding none, the system now climbs to node 1 and looks at its higher node's next record field. As node 0 does allow for a user response and is not flagged for an additional selection, the system terminates.

The node tree of the final report no longer contains a reference to a comment. If the user wished to indicate that a comment was considered and not given, the user may have input "none" under comment and a node would have been constructed and this leg of the node tree would have been preserved.

Whereas the invention has been shown and described in connection with the preferred embodiment thereof, it will be understood that many modifications, substitutions and additions may be made which are within the intended broad scope of the appended claims.

I claim:

1. A method for recording user interaction with a computer data base to generate reports, comprising the steps of:

providing a computer information processing system, including a data base which interacts with user data input to build a hierarchical data tree based upon system responses;

a user initially designating a source and a "next record" field in said system; each said "next record" field comprising instructions to direct a response by the system upon identification of a record with the designated source field;

said system searching a plurality of records forming said data base for records which have a target field matching the inputted source field, and displaying an initial record found for viewing by the user;

the system reading the instructions of the initially designated "next record" field of the initial record and interacting with records matching the initial record's source field according to those instructions;

said system responding to a "response expected" instruction in a "next record" field by prompting the user for one of two responses; wherein the two responses consist of:

(1) requesting the user to select a record with a target field matching the displayed source field; and (2) requesting the user to provide a separate response as a selection;

said system responding to a "no response expected" instruction in a "next record" field by finding all records with target fields matching the source field of the displayed record, and automatically selecting the first record found;

said system recording a selection from the user or system as a first node, utilizing a block of computer memory;

said computer system designating nodes in a predetermined hierarchical sequence, designating nodes with identical target fields as being on the same horizontal level, and designating a node with a source field matching a designated record's target field as being on a higher level than the designated record, each said node containing references to a previously selected node on the same level, the next node to be selected on the same level, the next higher level node and the next lower level node;

said system searching said data base for records which have a target field matching the source field of a second selected source field inputted by the user or system, and displaying a first matching record found for viewing by the user or system;

said system recording a selection of a displayed record by the user or the system, as a second node, on a lower vertical level than the first node;

continuing the steps of searching records, displaying a record, and recording selections, until no matching target fields are found for a selected record source field, at which time a first vertical leg of a hierarchical data tree is terminated; and said system generating a report of all recorded nodes.

2. A method for recording user interaction with a computer data base to generate reports, comprising the steps of:

providing a computer information processing system, including a data base which interacts with user data input to build a hierarchical data tree based upon system responses;

a user initially designating a source and a "next record" field in said system;

each said "next record" field comprising instructions to direct a response by the system upon identification of a record with the designated a sought source field;

said system searching a plurality of records forming said data base for records which have a target field matching the inputted source field, and displaying an initial record found for viewing by the user;

the system reading the instructions of the initially designated "next record" field of the displayed record and interacting with records matching the displayed record's source field according to those instructions;

said system responding to a "response expected" instruction in a "next record" field by prompting the user for one of two responses; wherein the two responses consist of:

(1) requesting the user to select a record with a target field matching the displayed source field; and (2) requesting the user to provide a separate user response as a selection;

said system responding to a "no response expected" instruction in a "next record" field by finding all records with target fields matching the source field of the displayed record, and automatically selecting the first record found;

said system recording a selection from the user or system as a first node, utilizing a block of computer memory;

said computer system designating nodes in a predetermined hierarchical sequence, designating nodes with identical target fields as being on the same horizontal level, and designating a node with a source field matching a designated record's target field as being on a higher level than the designated record, each said node containing references to a previously selected node on the same level, the next node to be selected on the same level, the next higher level node and the next lower level node;

said user selecting a first record displayed by the system, in response to a prompt from the computer system caused by a "response expected" instruction in the initially designated "next record" field;

said system searching said data base for records which have a target field matching the source field of a selected first record and displaying a first matching record found for viewing by the user;

said system recording a selection of a displayed record by the user or the system, as a second node, on a lower vertical level than the first node;

continuing the steps of searching records, displaying a record, and recording selections, until no matching target fields are found for a selected record source field, at which time a first vertical leg of a hierarchical data tree is terminated; and said system generating a report of all recorded nodes.

3. A method for recording user interaction with a computer data base to generate reports, comprising the steps of:

providing a computer information processing system, including a data base which interacts with user data input to build a hierarchical data tree based upon system responses;

a user initially designating a source and a "next record" field in said system;

each said "next record" field comprising instructions to direct a response by the system upon identification of a record with the designated source field;

said system searching a plurality of records forming said data base for records which have a target field matching the inputted source field, and displaying an initial record found for viewing by the user;

the system reading the instructions of the initially designated "next record" field of the displayed record and interacting with records matching the displayed record's source field according to those instructions;

said system responding to a "response expected" instruction in a "next record" field by prompting the user for one of two responses; wherein the two responses consist of:

(1) requesting a user to select a record with a target field matching the displayed source field and (2) requesting a user to provide a separate user response as a selection;

said system responding to a "no response expected" instruction in a "next record" field by finding all records with target fields matching the source field of the displayed record, and automatically selecting the first record found;

said system recording a selection from the user or system as a first node, utilizing a block of computer memory;

said computer system designating nodes in a predetermined hierarchical sequence, designating nodes with identical target fields as being on the same horizontal level, and designating a node with a source field matching a designated record's target field as being on a higher level than the designated record, each said node containing references to a previously selected node on the same level, the next node to be selected on the same level, the next higher level node and the next lower level node;

said system searching said data base for records which have a target field matching the source field of a record automatically selected by the computer system caused by a "no response expected" instruction in the initially designated "next record" field, and displaying a first matching record found for viewing by the user;

said system recording a selection of a displayed record by the user or the system, as a second node, on a lower vertical level than the first node;

continuing the steps of searching records, displaying a record, and recording selections, until no matching source fields are found for a selected record source field, at which time a first vertical leg of a hierarchical data tree is terminated; and said system generating a report of all recorded nodes.

4. The method of claim 1, 2 or 3, further comprising the steps of:

said system searching the next higher node above the last recorded node, after the step of terminating the first vertical leg of the data tree, and checking the "next record" field thereof;

said system searching the data base for a second record with a target field matching the source field of the next higher node, and said system moving vertically up a node level if no match is found;

continuing the steps of searching the next higher node, searching the data base for a second record, and moving vertically up a node level until all nodes in the vertical leg are searched.

5. The method of claims 1, 2 or 3, further comprising the steps of:

said system searching the next higher node, after the step of terminating the first vertical leg of the data tree, and checking the "next record" field thereof;

if the next higher node next record field calls for a user response, and an additional selection is needed, then said system searching the data base for a second record with a target field matching the source field of the next higher node and displaying a matching record to the user;

if the next higher node next record field calls for no user interaction, then said system searching the database for an unused record with a target field which matches the next higher node source field, and displaying a next match;

said user or system selecting the displayed record;

said system adding a node on the same horizontal level and designating the added node as horizontal node 1.

6. The method of claim 5, further comprising the steps of:

said system searching said data base for records which have a target field matching the source field of the horizontal node 1, and displaying a first matching record found for viewing by the user;

continuing the steps of recording selected records, searching records and displaying records until no matching source fields are found for a selected record source field at which time a vertical leg below the horizontal node is terminated.

* * * * *